Jan. 6, 1953  C. DELACOSTE ET AL  2,624,072
METHOD OF MAKING HOLLOW PLASTIC ARTICLES
Filed Jan. 20, 1951
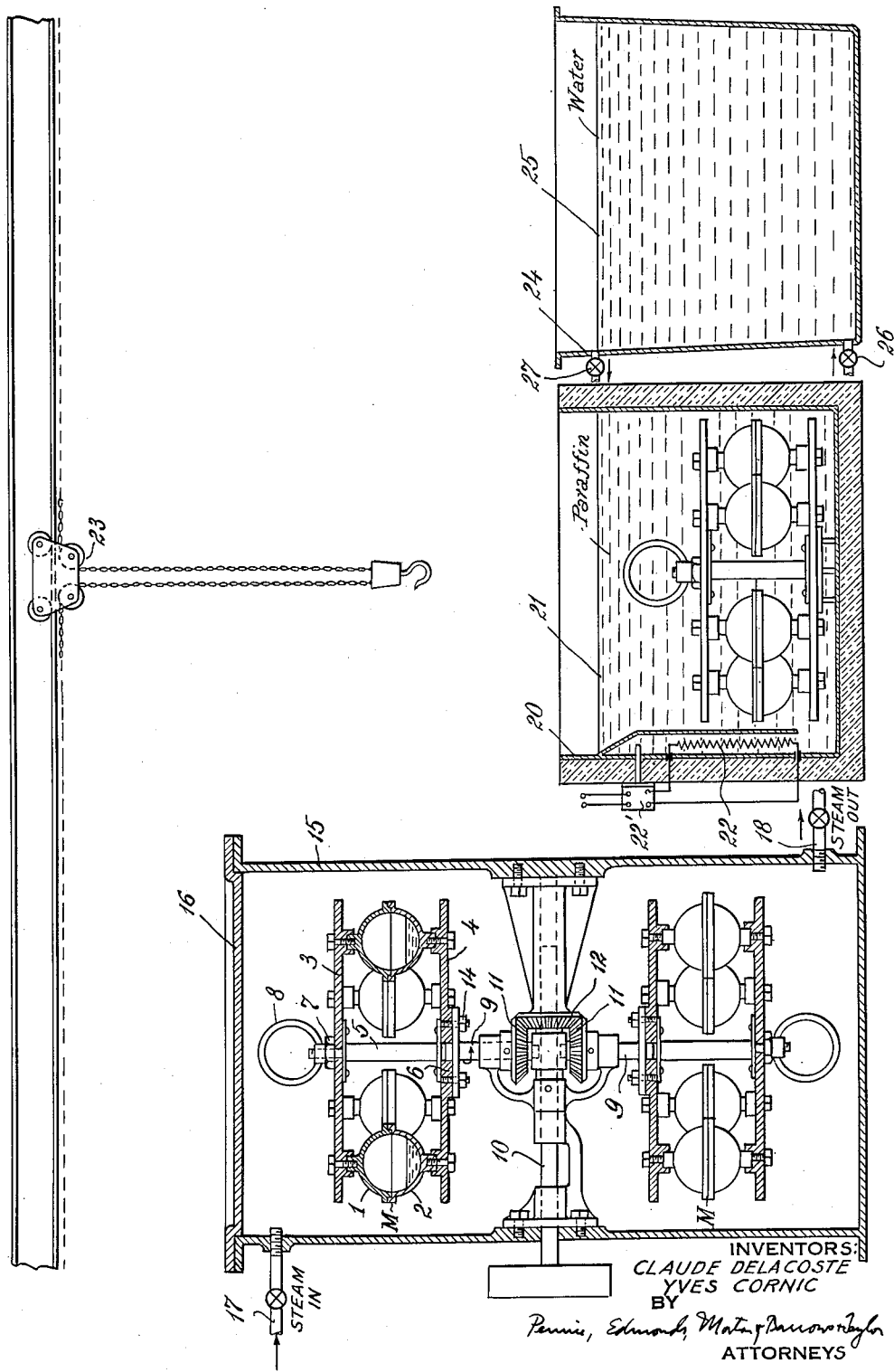
INVENTORS:
CLAUDE DELACOSTE
YVES CORNIC
BY
ATTORNEYS Patented Jan. 6, 1953

2,624,072

UNITED STATES PATENT OFFICE 2,624,072

METHOD OF MAKING HOLLOW PLASTIC ARTICLES

Claude Delacoste, Paris, and Yves Cornic, Asnieres, France, assignors, by mesne assignments, to Vinl-Cast, Inc., Akron, Ohio, a corporation of Ohio Application January 20, 1951, Serial No. 207,022

1 Claim. (Cl. 18—58.3)

This invention relates to a method of making hollow articles of substantially uniform wall thickness out of plasticized heat setting resins.

Certain resins of the general class comprising the polymers and the copolymers of vinyl chloride, vinyl acetate, and similar materials, when suitably plasticized and set or cured by heat, form a tough, durable material which may be relatively rigid or flexible and elastic, depending upon the formulation. In the production of articles from such material, the heating thereof for curing or setting the resin must be carefully controlled. Thus, if the mold is heated before the resin mixture has completely coated the mold surfaces, irregular gelling of the resin, with resultant non-uniformity of wall thickness of the article, results. Further, care must be taken to both avoid heat discoloration or degrading of the resin material due to over-curing and incomplete or impermanent setting.

The present invention has for its object an improved method for producing hollow articles of substantially uniform wall thickness from plasticized thermosetting resins in a rapid and economical manner and without under- or over-curing the resin material.

In the accompanying drawing, the single figure represents in a diagrammatic and simplified manner one form of apparatus that may be used in carrying out the method of the invention.

The material used to form the hollow articles in the method of the invention comprises generally a heat setting resin which is initially plasticized to a freely flowable state having a consistency not substantially more viscous than that of thick table cream. This material, when at or below room temperature, tends to adhere to the inner walls of the mold employed. When heated to a moderate temperature of say 110° F. to about 212° F., the materal congeals or gels but does not completely or permanently set or cure, for which purpose a higher temperature, generally above about 350° F., is required. The material preferably comprises a polymer or copolymer of a vinyl resin, such as vinyl chloride, vinyl acetate, vinylidene chloride, vinyl chloride-vinylidene chloride, copolymers of vinyl chloride with vinyl acetate, and the like, to which has been added a suitable plasticizer, such as tricresyl phosphate, dibutyl phthalate, dioctyl phthalate, or the like. There may also be used monomers or mixtures of monomers of the resins indicated together with a polymerization catalyst and a plasticizer of the type indicated. One satisfactory material is a polyvinyl chloride resin. One such resin is manufactured by the B. F. Goodrich Chemical Company and sold under the trade name and designation "Geon Paste Resin 121," to which is added a plasticizer of the type indicated in an amount sufficient to produce the consistency described.

Measured quantities of the fluid resin mixture sufficient to complete the desired article are placed in hollow molds preferably formed of metal and having relatively thin walls to expedite the transfer of heat to and from the resin material. The filled molds are closed and are subjected to compound motion at room temperature (below about 95° F.) so as to distribute a part of the fluid resin uniformly in the form of a coating which adheres to the interior wall of the mold at all points thereof. The compound motion may be imparted to the mold in various ways, as by swinging or rotating it in a manner to obtain a "sloshing" of the fluid material about the interior thereof. The compound motion may be conveniently accomplished by subjecting the molds to compound rotary motion as by slowly rotating the molds simultaneously about two angularly disposed axes, which carries the fluid material repeatedly and uniformly by gravity over the entire interior surfaces of the mold. This first forming step is carried out at a temperature below that at which congealing or gelling of the resin mixture takes place and generally a room temperature of about between 60 and 95° F. is suitable. It does not distribute all of the fluid material, but only a portion thereof which clings to or wets the walls of the mold.

After the low temperature fluid distribution step has continued until the mold walls are completely wetted or coated with an adhering layer of the resin mixture, a gelling or congealing step is performed by raising the temperature of the molds to about 110° to 212° F., as by surrounding the mold with an atmosphere of steam, while continuing the compound motion of the mold. This gels or congeals the initially cold distributed layer of the plasticized resin mixture and congeals thereon successive layers as the compound motion of the mold distributes the remaining fluid mixture uniformly and repeatedly over the inner mold wall, and produces a gelled or congealed layer of substantially uniform thickness on the inside of the mold. The initial cold distribution step avoids the non-uniform congealing of the resin mixture and particularly the congealing of a portion of the mixture at areas where it first contacts the mold walls when introduced. The congealing step is continued until all of the fluid resin is gelled or congealed on the mold wall.

At the end of the congealing step, the articles are fully formed and the compound motion of the mold may then be discontinued during the ensuing steps. In the curing step which follows, the metal molds are uniformly heated to and held at a curing temperature by submerging them in a heated bath of a suitable liquid for a time interval. By curing the material in this manner, the resin is rapidly heated to and held at but not above the desired curing temperature, and over- or under-curing is readily avoided. The liquid employed for the heated bath may comprise a suitable oil or glycerin but it is preferred to employ a wax, such as paraffin, which is liquid at the curing temperature but solidifies when cooled to or below room temperature. The use of such a wax for this purpose avoids soiling the formed hollow articles by contact with the bath material when the articles are subsequently removed from the molds. If a bath material that does not solidify on cooling is employed, it is unavoidably transferred by the hands of the operators or otherwise to the finished articles. The temperature of the curing bath may effectively be from about 320° F. to 400° F. The time during which the molds are submerged in the bath is sufficient to completely set the resin mixture and this may be readily determined by test. Because the hot bath quickly and uniformly heats the molds and their contents to or near the bath temperature, relatively low bath temperatures, near the minimum temperatures effective for a complete setting of the resin, can be used, and the time of immersion in the bath can be extended beyond that necessary to complete the curing without over-curing and so discoloring or degrading the product.

At the conclusion of the curing step, the molds are withdrawn from the heated bath and submerged in a cooling bath of fluid such as water at a temperature generally below room temperature. The molds are cooled in this bath for a sufficient interval to bring the articles and the molds to well below 250° F. and preferably to a temperature at which they can be handled. The molds are then withdrawn from the cooling bath and opened and the finished articles are removed therefrom.

Many forms of apparatus may be used to carry out the method. As diagrammatically illustrated in the drawing, the molds, here shown as spherical metal molds M for making hollow balls, comprise separable semi-cylindrical mold halves 1 and 2 and for convenience a plurality of corresponding mold halves may be secured to each of a pair of plates 3 and 4 which can be releasably held together to close the molds by a central bolt 5 having a flange 6 at one end secured to the plate 4 and a nut 7 at the other bearing against the outer surface of the plates 3. A ring nut 8 may be threaded to the outer end of the bolt 5 for lifting the set of molds.

For providing compound motion, a plurality of the described sets of molds may be removably secured respectively to radial arms 9 rotatably secured to a horizontal shaft 10 that may be rotated by any suitable means. A bevel gear 11 on each radial arm 9 engages a stationary bevel gear 12 and so rotates the arms 9 about their axes as the shaft 10 is rotated about its axis, thus imparting to the molds M compound rotary motion about two angularly disposed axes. The several sets of molds may be removably secured to the respective radial arms 9 by any suitable means, such as bolts 14.

A housing 15 having a removable cover 16 surrounds the compound motion apparatus and steam or other heated fluid for providing the congealing heat may be circulated within this housing between the valve controlled pipe connections 17 and 18. The initial cold distribution step may be carried out with no steam or other heating fluid in the housing, and then the steam may be turned on to carry out the congealing step, the compound motion of the molds continuing throughout both steps.

A curing tank 20 adjacent the described apparatus is filled with a heated fluid 21, preferably paraffin, which is held at the curing temperature by suitable means, such as an electric heating unit 22 controlled by a thermostat 22'. The tank 20 may be insulated. A plurality of sets of molds may be lowered into the tank 20 by suitable means, such as an overhead crane 23, which as illustrated may extend over the compound motion apparatus and the cooling tank 24 as well as the curing tank 20.

After the curing step, the sets of molds are lifted out of the tank 20 and lowered into a cooling bath in the tank 24 through which water 25 may be circulated between valve controlled inlet and outlet pipes 26 and 27. After cooling, the molds may be removed from the tank 24 by the crane 23 and opened to remove the finished articles, after which the molds are returned for refilling.

As an example of the method, the molds M may be supplied with suitable charges of fluid plasticized polyvinyl chloride resin, and subjected to compound motion at or about room temperature until the interior mold walls are completely wetted with the fluid mixture. A time of one to three minutes is usually sufficient for this purpose, although a longer time of cold distribution is not objectionable. Steam at a temperature of from about 190 to 212° F. is then circulated around the molds while the compound motion thereof continues until the resin mixture is completely gelled or congealed in layers on the mold walls. This may be accomplished in seven minutes or less, and the minimum time at any given steam temperature may be readily determined by test. The heat curing step may be carried out in a paraffin bath maintained at about 350° F. for about seven minutes, which produces a complete cure of the identified resin without scorching, discoloration or degrading. The minimum time required to cure each particular resin or resin mixture at any given curing temperature may be readily determined by test. At the end of the curing step, the molds are placed in the cooling water in the cooling tank and there cooled to a temperature low enough so that they can be conveniently handled for removal of the articles and preferably below the temperature at which the paraffin or other wax used in the curing bath solidifies. The cooled molds are then removed from the water and the articles are removed therefrom.

We claim:

In a method of producing a hollow plastic article, the steps which comprise subjecting to compound motion a closed non-porous mold having an initial temperature not substantially exceeding 95° F., and containing a fluid mixture of a thermosetting vinyl chloride resin and a plasticizer until the mold walls are completely wetted with the mixture and increasing the temperature of the mold to between about 110° F. and 212° F. while continuing such compound motion until the fluid mixture is completely congealed on the mold walls, then submerging the mold while quiescent in a liquid bath heated to a temperature of from about 320° F. to 400° F. until the mixture is completely cured and then cooling the mold to a temperature below 250° F.

CLAUDE DELACOSTE.
YVES CORNIC.

REFERENCES CITED

The following references are of record in the file of this patent:

UNITED STATES PATENTS

| Number | Name | Date |
|---|---|---|
| 1,784,686 | Fauerbach | Dec. 9, 1930 |
| 1,995,977 | Gonda | Mar. 26, 1935 |
| 1,998,897 | Kay | Apr. 23, 1935 |
| 2,035,774 | Trobridge | Mar. 31, 1936 |
| 2,265,226 | Glewell | Dec. 9, 1941 |

FOREIGN PATENTS

| Number | Country | Date |
|---|---|---|
| 500,298 | Great Britain | Feb. 7, 1939 |